United States Patent [19]
Hsu et al.

[11] Patent Number: 5,602,213
[45] Date of Patent: Feb. 11, 1997

[54] HEAT RESISTANT COMPOSITION BISMALEIMIDE-MODIFIED POLYURETHANE

[75] Inventors: Sheng-Yaw Hsu, Taichung; Tzong-Ming Lee, Tainan; Jing-Pin Pan, Hsinchu, all of Taiwan

[73] Assignee: Industrial Technology Research Institute, Taiwan, China

[21] Appl. No.: 89,797

[22] Filed: Jul. 9, 1993

[51] Int. Cl.$^6$ .................................................. C08F 283/04
[52] U.S. Cl. ........................ 525/454; 525/455; 525/422; 525/540; 525/929
[58] Field of Search ................................. 525/454, 455, 525/422, 540

[56] References Cited

U.S. PATENT DOCUMENTS

| | | | |
|---|---|---|---|
| 4,085,164 | 4/1978 | Gruffaz et al. | 525/440 |
| 4,143,029 | 3/1979 | Matthews et al. | 524/94 |
| 4,937,175 | 6/1990 | White et al. | 430/300 |
| 4,942,093 | 7/1990 | Lawson | 428/423.3 |
| 5,041,519 | 8/1991 | Pan et al. | 528/114 |
| 5,110,850 | 5/1992 | Farkas | 524/100 |
| 5,310,850 | 5/1994 | Chen et al. | 528/73 |

FOREIGN PATENT DOCUMENTS

| | | |
|---|---|---|
| 834680 | 4/1971 | Belgium . |
| 5898325 | 6/1983 | Japan . |

OTHER PUBLICATIONS

Pan et al., "Effect of Barbituric Acid on the Self–Polymerization Reaction of Bismaleimides", *Journal of Applied Polymer Science*, vol. 45, pp. 103–109.

*Primary Examiner*—Leszek Kiliman
*Assistant Examiner*—Mary Critharis
*Attorney, Agent, or Firm*—Darby & Darby, PC

[57] ABSTRACT

A heat resistant composition comprising a mixture of (a) a polyurethane or a modified polyurethane and (b) a bismaleimide oligomer, in which the bismaleimide oligomer is in an amount of about 1 to 35 percent by weight based on overall solid contents. The polyurethane is formed by reacting a diisocyanate-containing compound with a dihydroxy diol-compound. Then the polyurethane is reacted with a trimellitic anhydride, a diacid or a mixture thereof to form the modified polyurethane. The bismaleimide oligomer is formed by reacting a bismaleimide resin with a barbituric acid or a derivative thereof.

14 Claims, No Drawings

# HEAT RESISTANT COMPOSITION BISMALEIMIDE-MODIFIED POLYURETHANE

BACKGROUND OF THE INVENTION

The present invention relates to a heat resistant composition, in particular to a mixture of (a) a polyurethane or a modified polyurethane and (b) a bismaleimide oligomer for heat resistant adhesives with high performance.

Polymer materials used in electric insulation comprise polyimide, polyamideimide, polyesterimide, polyester, and polyurethane, etc. Such materials can be used as adhesives, insulating films, insulating varnishes and IC packaging materials. Particularly, polyurethanes possess excellent mechanical properties and electric and adhesive characteristics, and are good in processing and low in cost. Therefore, it is worth developing polyurethanes for industrial applications in the future. However, polyurethane is relatively poor in heat resistance and is generally used at a low temperature such as only 105° C. for long time operation. Recently, how to improve the heat resistance of polyurethane becomes an important topic in many researches.

In general, there are two methods to improve heat resistance of polyurethane. One is blending polyurethane with heat resistant materials such as polyimide, polyesterimide or polyamideimide to enhance the heat resistance thereof. The other is heating a mixture of a polyurethane prepolymer containing isocyanate' protecting group(s) and an alcohol having polyfunctional group and removing the protecting group to obtain a good heat resistant product.

Belgian Patent No. 834,680 issued on Apr. 20, 1976 discloses a thermosetting resin composition prepared from four compounds, polyesterdiol, glycol, diphenylmethane-4, 4'-diisocyanate and butylene glycol. The four compounds are first mixed and reacted at a temperature of 100° C. to form polyurethane. Such polyurethane is then mixed with bismaleimide and dicumyl peroxide and reacted at a temperature of 100° C. for 3.5 hours to obtain the thermosetting composition. The patent is directed to the conformation of polyurethane formed from polymeric polyol. Such conformation increases the softness of polymer but lowers the glass transition temperature (Tg) of polyurethane to lose the applicability at high temperatures.

Japanese KoKai Publication No. Sho 58-98325 issued on Jun. 11, 1983 discloses that a hydroxy-containing epoxy resin reacts with a diisocyanate-containing compound to form a isocyanate-containing polyurethane prepolymer and subsequently, said prepolymer is mixed with bismaleimide to form a varnish for the immersion of glass fibre cloth which is used to produce printed circuit broads. The varnish will form cross linking resin while curing. The resultant resin possesses high crosslinking but poor physical properties so that it is not easy to form a film at low or high temperatures.

U. S. Pat. No. 4,942,093 issued on Jul. 17, 1993 discloses a polyurethane adhesive comprising a mixture of bismaleimide and isocyanate-terminated rubber polymer is used for the adhesion between a cured rubber compound and a cured polyurethane or of an uncured rubber compound and a cured polyurethane to improve the poor adhesion of the uncured polyurethane. However, the glass transition temperature (Tg) thereof is low.

Normally, polyurethane has low heat resistance and low glass transition temperature (Tg). Polyurethane will become soft when used at high temperatures. This is a major drawback of polyurethane.

Accordingly, the present invention provides a heat resistant composition comprising (a) a polyurethane or a modified polyurethane, i.e. a polyamideimide-urethane or a polyamide-urethane and (b) a bismaleimide oligomer. The glass transition temperature (Tg) of the composition according to the invention is significantly increased so that the composition is suitable for applications at higher operation temperatures. The marked improvement in the heat resistance of the composition of the invention is very valuable in industrial applications. The present invention also provides a method for producing a heat resistant polymer composition comprising mixing a direct synthesized polyamideimide-urethane, polyamide-urethane or polyurethane with a bismaleimide oligomer.

SUMMARY OF THE INVENTION

It is therefore an object of the present invention to provide a heat resistant composition comprising a mixture of a bismaleimide oligomer and a polyurethane/a modified polyurethane which mitigates the above drawbacks.

Another object of the present invention is to provide a heat resistant composition having excellent high temperature resistance and high glass transition temperature.

A further object of the present invention is to provide a heat resistant composition for the industrial application with high value.

Yet another object of this invention is to provide a modified polyurethane with peculiar thermal behavior with different heat resistances by different levels of processing.

These and other objects, advantages and features of the present invention will be more fully understood and appreciated by reference to the written specification.

DETAILED DESCRIPTION OF THE INVENTION

While this specification concludes with claims particularly pointing out and distinctly claiming that which is considered to be the invention, it is believed that the invention can be better understood from a reading of the following detailed description of the invention.

The present invention relates to a heat resistant composition comprising (a) a polyurethane or a modified polyurethane, i.e. a polyamideimide-urethane or a polyamide-urethane and (b) a bismaleimide oligomer. In particular, the heat resistant polyurethane-bismaleimide resin composition is prepared by directly mixing the components.

The present invention utilizes the commercially available raw materials and simple processes to prepare polyurethane, polyamide-urethane, polyamideimide-urethane and bismaleimide oligomer. By mixing one of the above three polyurethanes with a bismaleimide oligomer, the modified heat resistant resin composition in accordance with the present invention is obtained. The resultant composition can be used as wire coatings, films, adhesives and insulating materials.

The major components of the present invention comprise a polyurethane/a modified polyurethane, a bismaleimide (BMI) and a barbituric acid (BTA) or a derivative thereof. The preparation of these components is described as follows:

(A) The Preparation of Bismaleimide Oligomer

Bismaleimide is dissolved in an adequate solvent and then barbituric acid or a derivative thereof is added thereto. In the mixture, barbituric acid or the derivative thereof and bismaleimide are added in a molar ratio in the range of about 1:3 to 1:10. The mixture is reacted at a temperature of about 100° C. to 130° C. for about 0.5 to 6 hours to form a bismaleimide oligomer. The solvent used is selected from the group consisting of N,N-dimethyl acetamide, N,N-diemthyl formamide, N-methyl pyrrolidone, r-butyrolactone, benzene and xylene.

(B) The Preparation of Polyurethane and Modified Polyurethane

Polyurethane in general is formed by reacting a diisocyanate-containing compound with a dihydroxy diol-compound at a temperature of about 80° C. for about 1 to 4 hours.

And the modified polyurethane is produced by reacting a diisocyanate-containing compound in slight excess with a dihydroxy diol-compound in an adequate solvent to form a polyurethane prepolymer. Then about 1% to 60% by mole of a trimellitic anhydride, a diacid or a mixture thereof is added to react with the polyurethane prepolymer at a temperature of about 100° C. to 160° C. for about 1 to 4 hours to obtain a modified polyurethane comprising a polyamideimide-urethane or a polyamide-urethane.

The diisocyanate-containing compound is diisocyanate-containing aromatics, aliphatics or cycloaliphatics. The stoichiometric amount of diisocyanate-containing compound should be sufficient to react with the hydroxy, acid group and anhydride group in the reaction system. The dihydroxy diol-compound is polyester polyol, polyether polyol or diol-containing short chain compound with 2 —20 carbon atoms having 2 hydroxy groups. The diacid compound is p-phthalic acid, m-phthalic acid, 1,4-naphthalene carboxylic acid, 2,3-naphthalene carboxylic acid, 2,6-naphthalene carboxylic acid, adipic acid or sebacic acid. The molar ratio of diacid to diol-compound is in the range of about 1:10 to 6:4 and that of trimellitic anhydride to diol-compound is also in the range of about 1:10 to 6:4. The solvent used is selected from the group consisting of N,N-dimethyl acetamide, N,N-dimethyl formamide, N-methyl pyrrolidone, r-butyrolactone, benzene and xylene.

(C) The Preparation of a Bismaleimide-Modified Polyurethane Resin Composition A bismaleimide oligomer obtained from (A) and a polyurethane or a modified polyurethane from (B) are homogenously mixed at room temperature. The bismaleimide oligomer is in an amount of about 1 to 35% by weight based on overall solid contents. Then a polyurethane-bismaleimide resin or a modified polyurethane-bismaleimide resin, i.e. a bismaleimide-modified polyurethane resin composition, is therefore obtained according to the invention.

The bismaleimide used in the present invention has the following structural formula

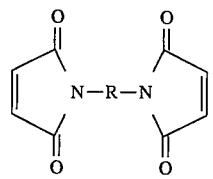

wherein R is $CH_2$, $C(O)$, $C(CH_3)_2$, O, S or $S(O)_2$.

The barbituric acid or a derivative thereof has the following structural formula

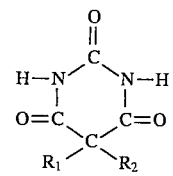

wherein R1 and R2 are independently selected from the group consisting of —H, —$CH_3$, —$C_2H_2$, —$C_6H_5$, —$CH(CH_3)_2$, —$CH_2CH(CH_3)_2$, —$CH_2CH_2CH(CH_3)_2$ and —$C(CH_3)H$-$(CH_2)_2$-$CH_3$.

The following examples are offered by way of illustration. The examples are not intended to limit the scope of the invention in any respect and should not be so construed.

EXAMPLES

Example 1

8.66 grams N,N'-4,4'-diphenylmethyl bismaleimide was dissolved in 14.75 grams r-butyrolactone. Then, 0.75 gram barbituric acid was added. The mixture was stirred and heated at a temperature of 110° C. for 1 hour to obtain a bismaleimide oligomer.

4.34 grams (0.07 mole) ethylene glycol was added and dissolved in 140.6 ml N-methyl pyrrolidone (NMP) in a 250 ml three-necked bottle. Then, 25.03 grams (0.1 mole) methylene di-para-phenylene isocyanate (MDI) was added into the bottle. The mixture was stirred at room temperature for 30 minutes. 5.7636 grams (0.03 mole trimellitic anhydride (TMA) was added thereinto and subsequently the mixture was stirred for another 30 minutes. The temperature was gradually increased to 150° C. and $CO_2$ gas was produced and evaporated. The mixture was still reacted at the temperature of 150° C. for another 2 hours to obtain a modified polyurethane, i.e. polyamideimide-urethane.

3.4 grams bismaleimide oligomer and 64.5 grams modified polyurethane were mixed at room temperature to obtain a polyamideimide-urethane bismaleimide resin composition.

The peel strength and the glass transition temperature at several indicated temperatures of the resultant resin composition were determined according to the normal test procedures in the art. The results were listed in Table 1.

Example 2

11.55 grams N,N'-4,4'-diphenylmethyl bismaleimide was dissolved in 25 grams r-butyrolactone. Then, 1 gram barbituric acid was added. The mixture was stirred and heated at a temperature of 120° C. for 1 hour to obtain a bismaleimide oligomer.

6.31 grams (0.07 mole) butylene glycol was added and dissolved in 148.4 ml N-methyl pyrrolidone (NMP) in a 250 ml three-necked bottle. Then, 25.03 grams (0.1 mole) methylene di-para-phenylene isocyanate (MDI) was added into the bottle. The mixture was stirred at room temperature for 30 minutes. 5.76 grams (0.03 mole) trimellitic anhydride (TMA) was added thereinto and subsequently the mixture was stirred for another 30 minutes. The temperature was gradually increased to 150° C. and $CO_2$ gas was produced and evaporated. The mixture was still reacted at the temperature of 150° C. for another 2 hours to obtain a modified polyurethane, i.e. polyamideimide-urethane.

3.16 grams bismaleimide oligomer and 60.54 grams polyamideimide-urethane were mixed at room temperature to obtain a polyamideimide-urethane bismaleimide resin composition.

Similarly, the peel strength and the glass transition temperature at several indicated temperatures of the resultant resin composition were determined according to the normal test procedures in the art. The results were listed in Table 1.

Example 3

8.66 grams N,N'-4,4'-diphenylmethyl bismaleimide was dissolved in 20 grams r-butyrolactone. Then, 1 gram barbituric acid was added. The mixture was stirred and heated at a temperature of 110° C. for 1 hour to obtain a bismaleimide oligomer.

7.43 grams (0.07 mole) diethylene glycol was added and dissolved in 223.64 ml N-methyl pyrrolidone (NMP) in a 250 ml three-necked bottle. Then, 35.04 grams (0.14 mole) methylene di-para-phenylene isocyanate (MDI) was added into the bottle. The mixture was stirred at room temperature for 30 minutes. 13.3 grams (0.07 mole) trimellitic anhydride (TMA) was added thereinto and subsequently the mixture was stirred for another 30 minutes. The temperature was gradually increased to 150° C. and $CO_2$ gas was produced and evaporated. The mixture was still reacted at the temperature of 150° C. for another 2 hours to obtain the modified polyurethane, i.e. polyamideimide-urethane.

3.4 grams bismaleimide oligomer and 64.51 grams polyamideimide-urethane were mixed at room temperature to obtain a polyamideimide-urethane bismaleimide resin composition.

Similarly, the peel strength and the glass transition temperature at several indicated temperatures of the resultant resin composition were determined according to the normal test procedures in the art. The results were listed in Table 1.

Example 4

8.66 grams N,N'-4,4'-diphenylmethyl bismaleimide was dissolved in 20 grams r-butyrolactone. Then, 1 gram barbituric acid was added. The mixture was stirred and heated at a temperature of 110° C. for 1 hour to obtain a bismaleimide oligomer.

11.56 grams (128 mmole) butylene glycol was added and dissolved in 105.4 ml N-methyl pyrrolidone (NMP) in a 250 ml three-necked bottle. Then, 48.04 grams (0.192 mole) methylene di-para-phenylene isocyanate (MDI) was added into the bottle. The mixture was stirred at room temperature for 30 minutes. 10.66 grams (0.66 mole) isophthalic acid was added thereinto and subsequently the mixture was stirred for another 30 minutes. The temperature was gradually increased to 150° C. and $CO_2$ gas was produced and evaporated. The mixture was still reacted at the temperature of 150° C. for another 2 hours to obtain a modified polyurethane, i.e. polyamide-urethane.

4.86 grams bismaleimide oligomer and 42.9 grams polyamide-urethane were mixed at room temperature to obtain a polyamide-urethane bismaleimide resin composition.

Similarly, the peel strength and the glass transition temperature at several indicated temperatures of the resultant resin composition were determined according to the normal test procedures in the art. The results were listed in Table 1.

Example 5

8.66 grams N,N'-4,4'-diphenylmethyl bismaleimide was dissolved in 20 grams r-butyrolactone. Then, 1 gram barbituric acid was added. The mixture was stirred and heated at a temperature of 110° C. for 1 hour to obtain a bismaleimide oligomer.

10.61 grams (0.01 mole) diethylene glycol was added and dissolved in 183.14 ml N-methyl pyrrolidone (NMP) in a 250 ml three-necked bottle. Then, 25.02 grams (0.01 mole) methylene di-para-phenylene isocyanate (MDI) was added into the bottle. The mixture was stirred at room temperature for 30 minutes. The temperature was gradually increased to 80° C. and the mixture was still stirred for another 2 hours to obtain a polyurethane.

3.4 grams bismaleimide oligomer and 64.5 grams polyurethane were mixed at room temperature to obtain a polyurethane bismaleimide resin composition.

Similarly, the peel strength and the glass transition temperature at several indicated temperatures of the resultant resin composition were determined according to the normal test procedures in the art. The results were listed in Table 1.

Comparative Example

Polyurethane was prepared according to the procedures described in Example 5 and was not modified with bismaleimide.

The peel strength and the glass transition temperature at several indicated temperatures of the produced polyurethane were also determined according to the normal test procedures in the art. The results were listed in Table 1.

TABLE 1

| Example | 1 | 2 | 3 | 4 | 5 | Comp. |
|---|---|---|---|---|---|---|
| BMI % | 10 | 10 | 10 | 10 | 10 | 0 |
| Tg[a] | 161.06 | 139.07 | 162.68 | 141.01 | 106.5 | 106.5 |
| Tg (160° C.) | 156.1 | 135.9 | 148.9 | 135.0 | 105.1 | 106.5 |
| Tg (180° C.) | 175.6 | 154.3 | 171.7 | 160.7 | 116.4 | — |
| Tg (200° C.) | 176.5 | 161.7 | 173.0 | 166.6 | 119.3 | — |
| Tg (220° C.) | — | 166.7 | — | 169.5 | 139.6 | — |
| Td | 268.3 | 311.0 | 299.5 | 303.6 | 295.7 | 298.47 |
| Peel Strength (lb/in) | 6.20[b] | 7.77[b] | 7.31[b] | 8.10[b] | 8.41[b] | 11.26[c] |

Note:
[a]The Tg value of polyurethane which is not mixed with bismaleimide was listed.
[b]The Tg value of the resultant resin composition containing the modified polyurethane in accordance with the present invention was determined by being coated on Cu foil and baked at a temperature of 200° C. for 3 hours.
[c]The Tg value of the resultant resin composition containing the modified polyurethane in accordance with the present invention was determined by being coated on Cu foil and baked at a temperature of 160° C. for 3 hours. If the resin coating was baked at a temperature of 200° C. for 3 hours, it became fragile.

In Table 1, the Tg values of the resin compositions were determined at the indicated temperatures for 3 hours. Although Tg(160° C.) is lower than Tg(A), the Tg values of the polyurethane or the modified polyurethane mixed with bismaleimide in the present invention are significantly higher than those of pure polyurethane as temperatures are increased.

In the comparative example, the peel strength of polyurethane baked at 160° C. is 11.26 lb/in. However, the polyurethane baked at 200° C. was almost destroyed and showed poor heat resistance. After bismaleimide was added, in addition to an increase in Tg value, the peel strength of the resin composition maintains 6.20 lb/in while it was baked at 200° C. for 3 hours.

To sum up, the polyurethane-bismaleimide resin, i.e. bismaleimide-modified polyurethane, of the present invention possesses excellent heat resistance, good mechanical property, good adhesion and flexibility. Furthermore, the resin composition possesses peculiar thermal behavior since it shows different heat resistances at different temperatures. The resin composition comprising bismaleimide-modified polyurethane of the present invention is therefore used as adhesives and substrates in flexible printed circuit (FPC), two-sided FPC, two-sided tape automatic bonding (TAB) or electric insulators at high temperatures.

The above description is given on the preferred embodiments of the invention, but it will be apparent that many modifications and variations could be effected by one skilled in the art without departing from the spirit or scope of the novel concepts of the invention, so that the scope of the invention should be determined by the appended claims only.

What is claimed is:

1. A heat resistant composition comprising
   (a) a polyamideimideurethane,
   (b) a bismaleimide oligomer, and
   (c) a solvent
wherein the bismaleimide oligomer is in an amount of about 1 to 35 percent by weight based on the overall solid contents.

2. A heat resistant composition as set forth in claim 1, wherein the polyamideimideurethane is obtained by reacting an excess of a diisocyanate containing compound with a dihydroxy diol-compound to form a polyurethane prepolymer and then reacting the polyurethane prepolymer with a trimellitic anhydride, at a temperature of about 100° C. to 160° C. for about 1 to 4 hours.

3. A heat resistant composition as set forth in claim 2, wherein the diisocyanate-containing compound is selected from the group consisting of diisocyanate containing aromatics, aliphatics and cycloaliphatics, and the stoichiometric amount of the diisocyanate containing compound is sufficient to react with the hydroxy, acid group and anhydride group in the reaction system.

4. A heat resistant composition as set forth in claim 2, wherein the dihydroxy diol-compound is selected from the group consisting of polyester polyol, polyether polyol to diol-containing short chain compounds with 2–20 carbon atoms having two hydroxy groups.

5. A heat resistant composition as set forth in claim 2, wherein a molar ratio of the trimellitic anhtydride and diol-compound is in the range of about 1:10 to 6:4.

6. A heat resistant composition as set forth in claim 1, wherein the bismaleimide oligomer is formed by reacting a bismaleimide resin with a barbituric acid in a molar ratio in the range of about 3:1 to 10:1 at a temperature of about 100° C. to 130° C. for about 0.5 to 6 hours.

7. A heat resistant composition as set forth in claim 6, wherein the barbituric acid has the structural formula

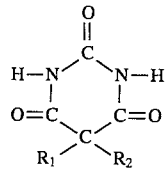

wherein $R_1$ and $R_2$ are independently selected from the group consisting of —H, —CH$_3$, —C$_2$H$_2$, —C$_6$H$_5$, —CH(CH$_3$)$_2$, —CH$_2$CH(CH$_3$)$_2$, —CH$_2$CH$_2$CH(CH$_3$)$_2$ and —C(CH$_3$)H—(CH$_2$)$_2$-CH$_3$.

8. A heat resistant composition as set forth in claim 1, wherein said bismaleimide has the formula

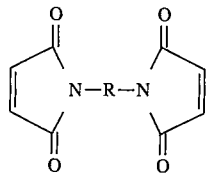

wherein R is CH$_2$, C(O), C(CH$_3$)$_2$, O, S or S(O)$_2$.

9. A heat resistant composition as set forth in claim 1, wherein the solvent is selected from the group consisting of N,N-dimethyl acetamide, N,N-dimetnyl formamide, N-methyl pyrrolidone, r-butyrolactone, benzene and xylene.

10. A heat resistant composition comprising
   (a) a polyamideimideurethane, and
   (b) a bismaleimide oligomer,
wherein the bismaleimide oligomer is in an amount of about 1 to 35 percent by weight based on the total weight of polymer and oligomer.

11. A method for preparing a heat resistant composition comprising blending
   (a) a polyamideimideurethane, and
   (b) a bismaleimide oligomer,
wherein the bismaleimide oligomer is in an amount of about 1 to 35 percent by weight based on the total weight of polymer and oligomer.

12. The method according to claim 11, wherein the polyamideimideurethane is obtained by reacting an excess of a diisocyanate-containing compound with a dihydroxy diol-compound to form a polyurethane prepolymer and then reacting the polyurethane prepolymer with a trimellitic anhydride, at a temperature of about 100° C. to 160° C. for about 1 to 4 hours.

13. The method according to claim 11 wherein the bismaleimide oligomer is formed by reacting a bismaleimide resin with a barbituric acid in a molar ratio in the range of about 3:1 to 10:1 at a temperature of about 100° C. to 130° C. for about 0.5 to 6 hours.

14. The method according to claim 11, wherein said bismaleimide has the formula

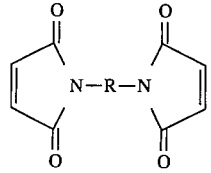

where R is CH$_2$, C(O), C(CH$_3$)$_2$, O, S or S(O)$_2$.

* * * * *